United States Patent
Bisht et al.

(10) Patent No.: US 12,503,650 B2
(45) Date of Patent: Dec. 23, 2025

(54) PROCESS FOR THE PRODUCTION OF NEEDLE COKE

(71) Applicant: Reliance Industries Limited, Mumbai (IN)

(72) Inventors: Harender Singh Bisht, Dehradun (IN); Asit Kumar Das, Faridabad (IN); Sukumar Mandal, Faridabad (IN); Ashwani H. Yadav, Panchkula (IN); Alpesh Upadhyay, Vadodara (IN); Priyanshu Arya, Koderma (IN); Mitul Sorathiya, Amreli (IN); Pravinsinh Vaghela, Vadodara (IN); Rakesh Jakasaniya, Vadodara (IN); Nibedita Sanyal, Kolkata West (IN); Shantilal Mohanlal Modha, Jamnagar (IN); Vijai Shankar Balachandran, Vellore (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 18/726,738

(22) PCT Filed: Dec. 29, 2022

(86) PCT No.: PCT/IB2022/062863
§ 371 (c)(1),
(2) Date: Jul. 3, 2024

(87) PCT Pub. No.: WO2023/126863
PCT Pub. Date: Jul. 6, 2023

(65) Prior Publication Data
US 2025/0066674 A1 Feb. 27, 2025

(30) Foreign Application Priority Data
Jan. 3, 2022 (IN) .............................. 202221000234

(51) Int. Cl.
*C10B 57/04* (2006.01)
*C10B 39/04* (2006.01)
(Continued)

(52) U.S. Cl.
CPC ............ *C10B 57/045* (2013.01); *C10B 39/04* (2013.01); *C10B 55/02* (2013.01); *C10B 57/005* (2013.01); *C10B 57/14* (2013.01)

(58) Field of Classification Search
CPC ......... C10B 39/04; C10B 55/00; C10B 55/02; C10B 57/005; C10B 57/045; C10B 57/14
See application file for complete search history.

(56) References Cited

U.S. PATENT DOCUMENTS 3,852,047 A * 12/1974 Schlinger .............. C10B 57/045 44/591
7,828,959 B2 * 11/2010 Ganji ...................... C10B 33/00 208/50

(Continued)

FOREIGN PATENT DOCUMENTS

EP 3722392 A1 10/2020

OTHER PUBLICATIONS

International Search Report issued in International Application No. PCT/IB2022/062863 mailed on Apr. 5, 2023 (3 pages).
(Continued)

*Primary Examiner* — James C Goloboy
(74) *Attorney, Agent, or Firm* — Osha Bergman Watanabe & Burton LLP

(57) ABSTRACT

The present disclosure relates to a process for the production of needle coke in a delayed coker plant. The needle coke so obtained by the process of the present disclosure has a co-efficient of thermal expansion (CTE) of less than 1.2× $10^{-6}$/° C. The process of the present disclosure eliminates the step of hydrotreating of the first feed and second feed for
(Continued)

the production of good quality coke. The process of the present disclosure maximizes the production of the needle coke having low CTE and low sulfur content in the delayed coker coke drum.

20 Claims, 2 Drawing Sheets

(51) Int. Cl.
*C10B 55/02* (2006.01)
*C10B 57/00* (2006.01)
*C10B 57/14* (2006.01)

(56) References Cited

U.S. PATENT DOCUMENTS

| | | |
|---|---|---|
| 2005/0284793 A1 | 12/2005 | Bhattacharyya et al. |
| 2019/0284482 A1* | 9/2019 | Faegh .................. C10B 57/045 |
| 2021/0179945 A1* | 6/2021 | Koseoglu ............... C10G 69/06 |

OTHER PUBLICATIONS

Written Opinion issued in International Application No. PCT/IB2022/062863 mailed on Apr. 5, 2023 (6 pages).

* cited by examiner

PROCESS FOR THE PRODUCTION OF NEEDLE COKE

FIELD

The present disclosure relates to a process for the production of needle coke.

Definitions

As used in the present disclosure, the following terms are generally intended to have the meaning as set forth below, except to the extent that the context in which they are used indicates otherwise.

Hydrotreating refers to a number of different processes that involve treatment of crude oil fractions with hydrogen. These processes can be grouped in two sub-classifications, viz. "hydropurification" and "hydroconversion". The "hydropurification" includes the treatment processes such as hydrodesulfurization, hydrodenitrogenation, hydrodeoxygenation, hydrodemetallization and the like. The "hydroconversion", involves the processes such as hydrogenation, hydrodearomatization, isomerization, hydrocracking and the like.

Needle coke refers to a specialty grade of petroleum coke valued for its crystalline structure that makes it a suitable material for making graphite electrodes.

Coefficient of thermal expansion (CTE) refers to a measure of the expansion or contraction of a material as a result of changes in temperature.

Conradson carbon residue (CCR), commonly known as "Concarbon" or "CCR" is a laboratory test used to provide an indication of the coke-forming tendencies of an oil. Quantitatively, the test measures the amount of carbonaceous residue remaining after the oil's evaporation and pyrolysis.

Superheated steam refers to a steam at a temperature higher than its vaporization point at the absolute pressure where the temperature is measured.

Delayed coker furnace refers to a type of coker whose process consists of heating a residual oil feed to its thermal cracking temperature in a furnace.

Coker or coker unit refers to an oil refinery processing unit that converts the residual oil from the vacuum distillation column into low molecular weight hydrocarbon gases, naphtha, light and heavy gas oils, and petroleum coke.

BACKGROUND

The background information herein below relates to the present disclosure but is not necessarily prior art.

Needle coke, named for its needle-like crystalline structure, is the highest value petroleum coke used for manufacturing graphite electrode for arc furnaces. As most of the steel manufacturers are switching to electric arc furnace (EAF) for production of steel, demand of premium needle coke making graphite electrodes for EAF is also increasing. Needle coke is also used to make synthetic spherical graphite for lithium ion battery anodes.

Graphite electrodes are used under harsh conditions, such as in high-temperature atmospheres, and therefore, it is desired that they have low thermal expansion coefficients (CTE). A lower thermal expansion coefficient reduces electrode wear during electric steelmaking, and can reduce costs in the steelmaking process. Therefore, fine control of the thermal expansion coefficient (CTE) of the needle coke is desirable.

Production of needle coke is both an art and science. The delayed coker unit, used for production of needle coke, operates on a partially batch and partially continuous process. In the process for the production of the needle coke, a furnace and fractionator are operated in a continuous mode whereas the coke drums are operated in a batch mode. Every time a coke drum is filled with coke, it is taken offline for coke removal while a second coke drum is taken online for the coking cycle in the delayed coker unit. Even with feed having all the desirable properties, it is difficult to produce premium needle coke in the coke drum and only a fraction of the coke produced in the coke drum meets the quality of premium needle coke.

The feed required to produce good quality needle coke is required to have very less amount of sulfur, nitrogen, asphaltenes and inorganic impurities. The sulfur, the nitrogen and the polyaromatics can be reduced in the feed charged into the coking drum through conventional processes such as hydrotreating. The hydrotreating processes include hydrodesulfurization, hydrodenitrification and hydrodearomatization.

Conventional processes involve maximizing the recycle of the heavy hydrocarbon fraction produced during the delayed coking operation of the needle coke to maximize yield of the needle coke. Wide range of recycle of the heavy fraction coker distillate and mixing this recycled distillate with the fresh feed are known. However, this recycling requires catalytic hydrotreating of the distillate fraction at 315° C. to 400° C. temperature, 350 psi to 2000 psi pressure and liquid hourly velocity (LHSV) of 0.2 to 3. The untreated distillate would affect the quality of the needle coke. It is known that with an increase in the recycle of the heavy fraction, the quality of the needle coke is affected.

Further inorganic additives such as fine chromium oxide, iron oxide, calcium fluoride powder and the like can be added in the coke feed to reduce the coefficient of thermal expansion (CTE) of the needle coke produced. However, addition of these inorganic additives increase the ash content of needle coke, which has maximum limit of 0.3 wt. % ash.

Therefore, the conventional processes for the manufacturing of the needle coke require hydrotreating/hydrogenation of either the fresh feed or the recyclable distillate. This increases the CAPEX/OPEX of the process and requires the commercial units capable of operating at high pressure and high temperature. The hydrotreating of the heavy petroleum fraction is a challenging process. Another disadvantage of hydrotreating is that there is always a significant loss of feed material because of the formation of lighter components during hydrotreatment. Further, the catalyst used in the hydrotreatment is required to be frequently changed or regenerated as the heavy components of the hydrotreated stream cause exhaustion and poisoning of the catalyst.

Therefore, there is felt a need to develop a process for the production of needle coke which obviates the drawbacks mentioned herein above or at least provides a useful alternative.

OBJECTS

Some of the objects of the present disclosure, which at least one embodiment herein satisfies, are as follows.

It is an object of the present disclosure is to ameliorate one or more problems of the prior art or to at least provide a useful alternative.

An object of the present disclosure is to provide a process for the production of needle coke.

Another object of the present disclosure is to provide a process for the production of needle coke without hydrotreatment.

Still another object of the present disclosure is to provide a process for the production of needle coke having low sulfur content and low CTE.

Yet another object of the present disclosure is to provide a simple, efficient and cost effective process for the production of needle coke.

Other objects and advantages of the present disclosure will be more apparent from the following description, which is not intended to limit the scope of the present disclosure.

SUMMARY

The present disclosure relates to a process for the production of needle coke. The process comprises mixing a predetermined amount of a first feed and a second feed in a fractionator and simultaneously heating the fractionator to obtain a blend having a first predetermined temperature. The blend is passed to a delayed coker furnace and the furnace is heated to a second predetermined temperature to obtain a heated coker feed. The heated coker feed is passed to a coke drum at a third predetermined temperature and at a predetermined pressure, and maintained it at the third predetermined temperature and the predetermined pressure for a first predetermined time period to obtain coke and a distillate. The coke is separated by allowing the distillate to exit from a top of the coke drum to the fractionator to obtain a separated coke in the coke drum. The separated coke in the coke drum is treated with a superheated steam for a second predetermined time period to obtain a treated coke. The treated coke is quenched with water to obtain the needle coke.

BRIEF DESCRIPTION OF THE ACCOMPANYING DRAWINGS

The present disclosure will now be described with the help of the accompanying drawings, in which.

Figure 3:
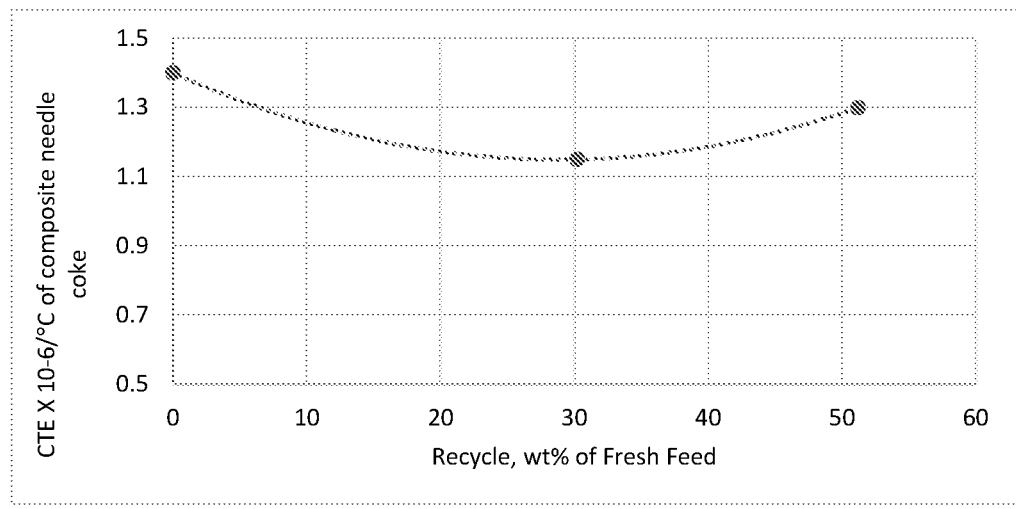
Figure 4:

FIG. 3 illustrates a graph representing the effect of unhydrotreated second feed on the co-efficient of thermal expansion (CTE) of the needle coke, wherein the needle coke is produced by using a first clarified slurry oil (CSO-1) in accordance with the present disclosure; and FIG. 4 illustrates a graph representing the effect of unhydrotreated second feed on the percentage of coke bed with CTE <$1.2\times10^{-6}$/° C. of the needle coke, wherein the needle coke is produced by using a first clarified slurry oil (CSO-1) in accordance with the present disclosure.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Needle coke, named for its needle-like crystalline structure, is the highest value petroleum coke used for manufacturing graphite electrode for arc furnaces. As most of the steel manufacturers are switching to electric arc furnace (EAF) for production of steel, demand of premium needle coke making graphite electrodes for EAF is also increasing. Needle coke is also used to make synthetic spherical graphite for lithium ion battery anodes.

Graphite electrodes are used under harsh conditions, such as in high-temperature atmospheres, and therefore, it is desired that they have low thermal expansion coefficients (CTE). A lower thermal expansion coefficient reduces electrode wear during electric steelmaking, and can reduce costs in the steelmaking process. Therefore, fine control of the thermal expansion coefficient (CTE) of the needle coke is desirable.

Production of needle coke is both an art and science. The delayed coker unit, used for production of needle coke, operates on a partially batch and partially continuous process. In the process for the production of the needle coke, a furnace and fractionator are operated in a continuous mode whereas the coke drums are operated in a batch mode. Every time a coke drum is filled with coke, it is taken offline for coke removal while a second coke drum is taken online for the coking cycle in the delayed coker unit. Even with feed having all the desirable properties, it is difficult to produce premium needle coke in the coke drum and only a fraction of the coke produced in the coke drum meets the quality of premium needle coke.

The feed required to produce good quality needle coke is required to have very less amount of sulfur and low amounts of nitrogen, asphaltenes and inorganic impurities. The sulfur, the nitrogen and the polyaromatics can be reduced in the feed charged into the coking drum through conventional processes such as hydrotreating. The hydrotreating processes include hydrodesulfurization, hydrodenitrification and hydrodearomatization.

Conventional processes involve maximizing the recycle of the heavy hydrocarbon fraction produced during the delayed coking operation of the needle coke to maximize yield of the needle coke. Wide range of recycle of the heavy fraction coker distillate and mixing this recycled distillate with the fresh feed are known. However, this recycling requires catalytic hydrotreating of the distillate fraction at 315° C. to 400° C. temperature, 350 psi to 2000 psi pressure and liquid hourly velocity (LHSV) of 0.2 to 3. The untreated distillate would affect the quality of the needle coke. It is known that with an increase in the recycle of the heavy fraction, the quality of the needle coke is affected.

Further inorganic additives such as fine chromium oxide, iron oxide, calcium fluoride powder and the like can be added in the coke feed to reduce the coefficient of thermal expansion (CTE) of the needle coke produced. However, addition of these inorganic additives increase the ash content of needle coke, which has a limit of 0.3 wt % ash.

Therefore, the conventional processes for the manufacturing of the needle coke require hydrotreating/hydrogenation of either the fresh feed or the recyclable distillate. This increases the CAPEX/OPEX of the process and requires the commercial units capable of operating at high pressure and high temperature. The hydrotreating of the heavy petroleum fraction is a challenging process. Another disadvantage of hydrotreating is that there is always a significant loss of feed material because of the formation of lighter components during hydrotreatment. Further, the catalyst used in the hydrotreatment is required to be frequently changed or regenerated as the heavy components of the hydrotreated stream cause exhaustion and poisoning of the catalyst.

In an aspect, the present disclosure provides a process for the production of needle coke. The process comprising the following steps:
  (i) mixing a predetermined amount of a first feed and a second feed in a fractionator and simultaneously heating the fractionator to obtain a blend having a first predetermined temperature;
  (ii) passing the blend to a delayed coker furnace and heating the furnace to a second predetermined temperature to obtain a heated coker feed;
  (iii) passing the heated coker feed to a coke drum at a third predetermined temperature and at a predetermined pressure, and maintaining it at the third predetermined temperature and the predetermined pressure for a first predetermined time period to obtain coke and a distillate;
  (iv) separating the coke by allowing the distillate to exit from a top of the coke drum to the fractionator to obtain separated coke in the coke drum;
  (v) treating the separated coke in the coke drum with superheated steam for a second predetermined time period to obtain a treated coke; and
  (vi) quenching the treated coke with water to obtain the needle coke.

The process is described in detail:

A predetermined amount of a first feed and a second feed are mixed in a fractionator and simultaneously heating the fractionator to obtain a blend having a first predetermined temperature.

In accordance with the present disclosure, the first feed is at least one selected from the group consisting of first clarified slurry oil (CSO-1), second clarified slurry oil (CSO-2), and vacuum gas oil (VGO). In an exemplary embodiment, the first feed is a first clarified slurry oil (CSO-1). In another exemplary embodiment, the first feed is a second clarified slurry oil (CSO-2). In still another exemplary embodiment, the first feed is a mixture of second clarified slurry oil (CSO-2) and vacuum gas oil (VGO).

In accordance with the present disclosure, a mass ratio of the second clarified slurry oil (CSO-2) to the vacuum gas oil (VGO) is in the range of 4:1 to 10:1. In an exemplary embodiment, the mass ratio of the second clarified slurry oil (CSO-2) to the vacuum gas oil (VGO) is 9:1. In another exemplary embodiment, the mass ratio of second clarified slurry oil (CSO-2) to vacuum gas oil (VGO) is 5.3:1.

In accordance with the present disclosure, the first clarified slurry oil (CSO-1) is characterized by having a sulfur content in the range of 0.8 mass % to 1.5 mass % with respect to the total mass of the blend; a Conradson Carbon Residue (CCR) in the range of 3 mass % to 8 mass % with respect to the total mass of the blend; an ash content in the range of 0.01 mass % to 0.15 mass % with respect to the total mass of the blend; a density is in the range of 0.5 g/cc to 1.5 g/cc; an asphaltene content <5 mass % with respect to the total mass of the blend; and a boiling temperature is in the range of 190° C. to 700° C.

In an exemplary embodiment, the first clarified slurry oil (CSO-1) is characterized by having the sulfur content 1.26 mass % with respect to the total mass of the blend; the CCR of 6.6 mass % with respect to the total mass of the blend; the ash content of 0.08% with respect to the total mass of the blend; the density of 1.063 g/cc; the asphaltene content is <5 mass % with respect to the total mass of the blend; and the boiling temperature is in the range of 197° C. to 700° C.

In accordance with the present disclosure, the second clarified slurry oil (CSO-2) is characterized by having a sulfur content in the range of 0.2 mass % to 0.8 mass % with respect to the total mass of the blend; a Conradson Carbon Residue (CCR) in the range of 8 mass % to 15 mass % with respect to the total mass of the blend; an ash content in the range of 0.01% to 0.1 mass % with respect to the total mass of the blend; a density is in the range of 0.5 g/cc to 1.5 g/cc; an asphaltene content <5 mass % with respect to the total mass of the blend; and a boiling temperature is in the range of 245° C. to 690° C.

In an exemplary embodiment, the second clarified slurry oil (CSO-2) is characterized by having the sulfur content 0.57 mass % with respect to the total mass of the blend; the CCR of 10.3 mass % with respect to the total mass of the blend; the ash content of 0.05% with respect to the total mass of the blend; the density of 1.084 g/cc; the asphaltene content is <5 mass % with respect to the total mass of the blend; and the boiling temperature is in the range of 250° C. to 683° C.

In accordance with the present disclosure, the clarified slurry oil (CSO) is obtained from the bottom of fluid catalytic cracking (FCC).

In accordance with the present disclosure, the vacuum gas oil (VGO) is characterized by having a sulfur content in the range of 0.08 mass % to 0.15 mass % with respect to the total mass of the blend; a Conradson Carbon Residue (CCR) in the range of 0.05 mass % to 0.5 mass % with respect to the total mass of the blend; an ash content in the range of 0 to 0.15 mass % with respect to the total mass of the blend; a density is in the range of 0.5 g/cc to 1.5 g/cc; an asphaltene content <5 mass % with respect to the total mass of the blend; and a boiling temperature is in the range of 280° C. to 600° C.

In an exemplary embodiment, the vacuum gas oil (VGO) is characterized by having the sulfur content 0.12 mass % with respect to the total mass of the blend; the CCR of 0.1 mass % with respect to the total mass of the blend; the ash content of 0% with respect to the total mass of the blend; the density of 0.906 g/cc; the asphaltene content is <5 mass % with respect to the total mass of the blend; and the boiling temperature is in the range of 284° C. to 594° C. In accordance with the present disclosure, the vacuum gas oil (VGO) is obtained from VGO hydrotreating process (VGOHT).

In accordance with the present disclosure, the first feed is hydrotreated or partially hydrotreated or unhydrotreated.

In accordance with the present disclosure, the second feed is a heavy recycle stream selected from heavy coker oil gas (HCGO), heavy coker distillate and heavy hydrocarbon stream. In the exemplary embodiments, the second feed is heavy coker oil gas (HCGO). In the exemplary embodiments, the second feed in heavy coker distillate.

In accordance with the present disclosure, the second feed has a boiling temperature in the range of 300° C. to 600° C.

In accordance with the present disclosure, the first feed and the second feed are not hydrogenated. In accordance with the embodiments of the present disclosure, the first feed i.e., clarified slurry oil (CSO-1), clarified slurry oil (CSO-2), and second feed i.e., heavy coker gas oil (HCGO) are not hydrogenated.

In accordance with the present disclosure, the predetermined amount of the second feed is in the range of 25 mass % to 40 mass % with respect to the total mass of the first feed. In an exemplary embodiment, the predetermined amount of the second feed is 30 mass % with respect to the total mass of the first feed. In another exemplary embodiment, the predetermined amount of the second feed is 25 mass % with respect to the total mass of the first feed. In still another exemplary embodiment, the predetermined amount of the second feed is 50 mass % with respect to the total mass of the first feed. In yet another exemplary embodiment, the predetermined amount of the second feed is 43 mass % with respect to the total mass of the first feed.

In accordance with the present disclosure, the first feed and the second feed are pre-heated to a temperature in the range of 150° C. to 250° C. prior to mixing in the fractionator in the step (i).

In accordance with the present disclosure, the first predetermined temperature is in the range of 300° C. to 400° C. In an embodiment, the first predetermined temperature is in the range of 325° C. to 350° C. In the exemplary embodiments, the first predetermined temperature is 330° C.

In accordance with the present disclosure, the amount of the second feed is inversely proportional to the sulfur content of the first feed i.e., the lower is the sulfur content in the first feed, greater will be the amount of the recyclable stream (second feed) that can be combined with the first feed.

Similarly, the amount of the second feed is inversely proportional to the density of the first feed i.e., the lower is the density of the first feed, the greater will be the amount of the recyclable stream (second feed) that can be combined with the first feed.

The blend is passed to a delayed coker furnace and the furnace is heated to a second predetermined temperature to obtain a heated coker feed.

In accordance with the present disclosure, the second predetermined temperature is in the range of 400° C. to 600° C. In an embodiment, the second predetermined temperature is in the range of 480° C. to 515° C. In the exemplary embodiments, the second predetermined temperature is 498° C.

The heated coker feed is passed to a coke drum at a third predetermined temperature and at a predetermined pressure, and maintained it at the third predetermined temperature and the predetermined pressure for a first predetermined time period to obtain coke and a distillate.

In accordance with the present disclosure, the third predetermined temperature is in the range of 400° C. to 600° C. In an embodiment, the third predetermined temperature is in the range of 425° C. to 500° C. In an exemplary embodiment, the third predetermined temperature is 440° C. In another exemplary embodiment, the third predetermined temperature is 485° C.

The third predetermined temperature can be 10° C. to 20° C. lower than the second predetermined temperature due to heat loss in transfer from furnace to coke drum.

In accordance with the present disclosure, the predetermined pressure is in the range of 2 kg/cm$^2$(g) to 10 kg/cm$^2$(g). In an embodiment, the predetermined pressure is in the range of 2.5 kg/cm$^2$(g) to 6 kg/cm$^2$(g). In an exemplary embodiment, the predetermined pressure is 3 kg/cm$^2$(g). In another exemplary embodiment, the predetermined pressure is 3.5 kg/cm$^2$(g).

In accordance with the present disclosure, the first predetermined time period is in the range of 15 hours to 50 hours. In an embodiment, the first predetermined time period is in the range of 18 hours to 36 hours. In an exemplary embodiment, the first predetermined time period is 24 hours. In another exemplary embodiment, the first predetermined time period is 20.5 hours. In still another exemplary embodiment, the first predetermined time period is 30 hours.

The coke is separated by allowing the distillate to exit from a top of the coke drum to the fractionator to obtain a separated coke in the coke drum.

In accordance with the present disclosure, the coke drum is filled up to 70% with the separated coke.

The separated coke in the coke drum is treated with superheated steam for a second predetermined time period to obtain a treated coke.

In accordance with the present disclosure, the superheated steam has a temperature in the range of 300° C. to 500° C. In the exemplary embodiments, the superheated steam has the temperature of 485° C.

In accordance with the present disclosure, the superheated steam has a pressure in the range of 2.5 kg/cm$^2$(g) to 10 kg/cm$^2$(g). In an exemplary embodiment, the superheated steam has the pressure of 3 kg/cm$^2$(g). In another exemplary embodiment, the superheated steam has the pressure of 3.5 kg/cm$^2$(g).

In accordance with the present disclosure, the second predetermined time period is in the range of 1 hour to 30 hours. In an exemplary embodiment, the second predetermined time period is 4 hours. In another exemplary embodiment, the second predetermined time period is 24 hours.

The treated coke is quenched with water obtain the needle coke.

In an embodiment, the treated coke is quenched with water in the coke drum. The coke is then cut with coke cutting tool using high pressure water jet. The needle coke is segregated based on coke quality. The needle coke is then stored in designated silos.

The yield of needle coke depends on the CCR of the blend that is charged to the coking chamber/drum i.e. the greater is the CCR of the blend, the higher is the yield of the needle coke. It has been identified that hydrotreating the distillate reduces the CCR not only of the distillate but also of the blend that is charged. Therefore, if the distillate is hydrotreated, although good quality needle coke may be produced, but at lower yields.

The process of the present disclosure produces the needle coke having low sulfur content and low CTE without the need of hydrotreatment of the heavy coker distillate. Therefore, the process of the present disclosure eliminates the hydrotreatment of the heavy coker distillate and hence, reduces the CAPEX/OPEX.

The process of the present disclosure is efficient and cost effective.

The needle coke of the present disclosure has a low sulfur content and a low CTE.

It is found that increasing recycle of unhydrotreated heavy coker distillate (second feed), beyond a certain percentage of the first feed, deteriorates quantity of good quality needle coke in the coke drum and there is an optimum recycle ratio of unhydrotreated first feed and unhydrotreated second feed where the maximum quantity of good quality needle coke in the coke drum can be obtained.

The needle coke of the present disclosure is a high quality petroleum coke having sulfur <0.5 mass %, ash content <0.2 mass %, Coefficient of thermal expansion (CTE) <1.2×10$^{-6}$/° C., and real density >2.13 g/cc.

In accordance with an embodiment of the present disclosure, a first feed is prepared by mixing desired amount of unhydrotreated CSO and hydrotreated-VGO to meet feed specification of sulfur, ash and aromatic content. The heat from hot coker products of the fractionator is exchanged with the first feed and passed to a fractionator bottom. A predetermined amount of a second feed (hot heavy coker gas oil (HCGO)) is mixed with the first feed in the fractionator bottom and heated to obtain a blend having temperature in the range of 325° C. to 350° C. The blend is passed to a delayed coker furnace and heated to a temperature of 480° C. to 515° C.) before routing to coke drum bottom operated at 3 to 6 kg/cm$^2$(g) coke drum top pressure. A sufficient time (20 to 36 hours) is allowed in a coke drum to convert coker feed to needle coke and distillates. The coke distillates from coke drum top is routed to the fractionator. The feed is switched over to $2^{nd}$ coke drum once the $1^{st}$ coke drum is filled with coke. The filled coke drum is steamed with superheated steam. The coke drum is quenched with water. The coke is cut with coke cutting tool using high pressure water jet. The needle coke is segregated based on coke quality. The needle coke is stored in designated silos.

The foregoing description of the embodiments has been provided for purposes of illustration and not intended to limit the scope of the present disclosure. Individual components of a particular embodiment are generally not limited to that particular embodiment but are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be tested to scale up to industrial/commercial scale and the results obtained can be extrapolated to industrial scale.

EXPERIMENTAL DETAILS

The Process for the Production of Needle Coke in a Delayed Coker Plant in Accordance with the Present Disclosure Examples Coker pilot plant of 1 barrel/day capacity was used for the experimental study. The coker pilot plant was equipped with feed vessels, feed pump, recycle pump, electric furnace, coke drum, fractionator and product vessels. The feed properties and experimental conditions used for the experiments are tabulated in tables 1 and 2, respectively.

TABLE 1

| Feed properties | | | |
|---|---|---|---|
| Feed Properties | Ex. 1, 2 & 3 | Ex. 4, 5, 6 & 7 | Ex. 6 & 7 |
| Feed | CSO-1 | CSO-2 | VGO |
| Sulphur, mass % | 1.26 | 0.57 | 0.12 |
| Density, g/cc | 1.063 | 1.084 | 0.906 |
| CCR, mass % | 6.6 | 10.3 | 0.1 |
| Ash, mass % | 0.08 | 0.05 | 0.0 |
| HT-SimDist, ° C. (ASTM D-2887) | | | |
| Initial boiling point | 197 | 250 | 284 |
| 5% | 295 | 327 | 345 |
| 10% | 332 | 337 | 370 |
| 30% | 371 | 368 | 415 |
| 50% | 401 | 396 | 448 |
| 70% | 435 | 432 | 482 |
| 90% | 509 | 512 | 531 |
| 95% | 644 | 576 | 552 |
| Final boiling point | 669 | 683 | 594 |

*CSO-1: First Clarified Slurry Oil, CSO-2: Second Clarified Slurry Oil, VGO: Vacuum Gas Oil (VGO)

TABLE 2

| Experimental conditions | | | | | | | |
|---|---|---|---|---|---|---|---|
| | Ex. 1 | Ex. 2 | Ex. 3 | Ex. 4 | Ex. 5 | Ex. 6 | Ex. 7 |
| First Feed | CSO-1 | CSO-1 | CSO-1 | CSO-2 | CSO-2 | CSO-2 84.2% + VGO 15.8% | CSO-2 90% + VGO 10% |
| Heavy coker distillate recycle, mass % (on First Feed) | 0.0 | 30.2 | 51.2 | 0.0 | 43.1 | 0.0 | 24.8 |
| Fractionator Bottom Temperature (° C.) | 330 | 330 | 330 | 330 | 330 | 330 | 330 |

TABLE 2-continued

| Experimental conditions | Ex. 1 | Ex. 2 | Ex. 3 | Ex. 4 | Ex. 5 | Ex. 6 | Ex. 7 |
|---|---|---|---|---|---|---|---|
| Furnace Outlet Temperature (° C.) | 498 | 498 | 498 | 498 | 498 | 498 | 498 |
| Coke drum outlet temperature (° C.) | 440 | 440 | 440 | 440 | 440 | 440 | 440 |
| Coke drum inlet temperature (° C.) | 485 | 485 | 485 | 485 | 485 | 485 | 485 |
| Coke drum pressure, kg/cm$^2$ (g) | 3.0 | 3.0 | 3.0 | 3.5 | 3.5 | 3.5 | 3.5 |
| Coking Cycle, Hrs | 24 | 20.5 | 24 | 30 | 30 | 30 | 30 |
| Superheated steam temperature (° C.) | 485 | 485 | 485 | 485 | 485 | 485 | 485 |
| Superheated steam pressure kg/cm$^2$ (g) | 3 | 3 | 3 | 3.5 | 3.5 | 3.5 | 3.5 |
| Steam stripping time, hrs | 24 | 24 | 4 | 4 | 4 | 4 | 4 |

\* CSO-1: First Clarified Slurry Oil, CSO-2: Second Clarified Slurry Oil, VGO: Vacuum Gas Oil (VGO)

Comparison of the Needle Coke Produced from the First Feed-Unhydrotreated Fresh Feed (CSO-1):

It can be observed from table 2 that in: (i) Example-1, there was no recycle of unhydrotreated heavy coker fraction (second feed), (ii) Example-2, there was 30.2% recycle of unhydrotreated heavy coker fraction (second feed), and (iii) Example-3, there was 51.2% recycle of unhydrotreated heavy coker fraction (second feed) on first feed basis.

A comparison of the quality of the feed/blend and the needle coke produced from unhydrotreated fresh feed (CSO-1) was performed and given in Table 3 and Table 4, respectively.

TABLE 3

Unhydrotreated recycle stream (second feed) properties

|  | Ex. 1 | Ex. 2 | Ex. 3 |
|---|---|---|---|
| Throughput Ratio (Fresh feed + Recycle)/Fresh Feed | 1.00 | 1.30 | 1.51 |
| Sulphur in HCGO Product, mass % | 1.85 | 1.94 | 2.03 |
| Density of HCGO Product, g/cc | 1.0617 | 1.0876 | 1.0915 |

*Fresh feed is first feed, and recycle feed is second feed.

It was observed from Table 3 that there was a significant change in the quality of unhydrotreated recycle stream generated at different throughput ratios (Fresh Feed+Recycle)/Fresh Feed. With increase in recycle of unhydrotreated heavy coker distillate stream (second feed), the density and the sulfur content of the heavy coker distillate product increases which in turn increases the sulfur and density of blended stream, which deteriorated the quantity and quality of needle coke. The same can be observed in the Table 4.

TABLE 4

Needle Coke Quality with CSO-1

|  | Ex. 1 | Ex. 2 | Ex. 3 |
|---|---|---|---|
| Throughput Ratio (Fresh feed + Recycle)/Fresh Feed | 1.00 | 1.30 | 1.51 |
| Composite Coke CTE × 10$^{-6}$/° C. | 1.40 | 1.15 | 1.30 |
| Sulfur, wt % | 1.14 | 1.19 | 1.22 |

*Fresh feed is first feed, and recycle feed is second feed.

Figure 1:
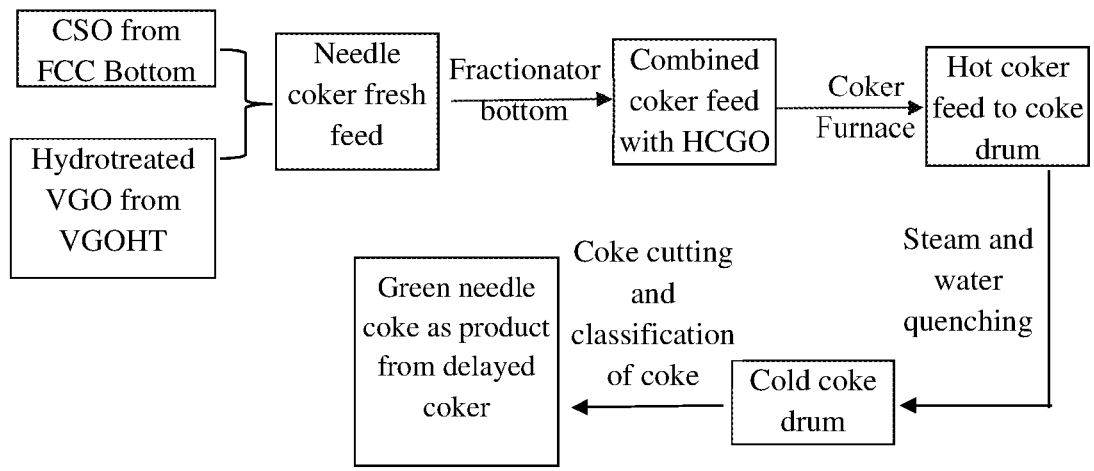
FIG. 1 illustrates a flow diagram of the process for the production of needle coke in accordance with an embodiment of the present disclosure.
Figure 2:
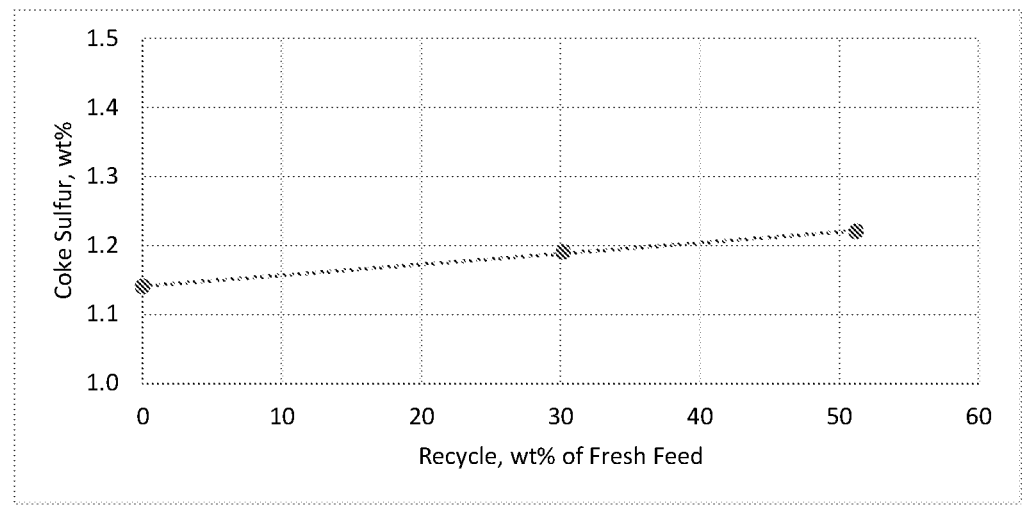
FIG. 2 illustrates a graph representing the effect of an unhydrotreated second feed on the sulfur content of the needle coke, wherein the needle coke is produced by using a first clarified slurry oil (CSO-1) in accordance with the present disclosure.

It can be observed from Table 4, that with increase of the amount of recycle (second feed) from 0% (in example 1) to 30% (in example 2), the CTE of the needle coke decreased and sulfur increased (see FIGS. 2 and 3). On further increase in recycle from 30% to 50%, both CTE and sulfur increased. Therefore, the coke quality was deteriorated upon increasing the recycle from 30% to 50%.

Table 5 illustrates zone-wise needle coke quality at different throughput ratios with CSO-1.

TABLE 5

Zone-wise needle coke quality at different throughput ratios with CSO-1

|  | Ex. 1 | Ex. 2 | Ex. 3 |
|---|---|---|---|
| Throughput Ratio (Fresh feed + Recycle)/Fresh Feed | 1.00 | 1.30 | 1.51 |
| Top Coke Bed | 1.48 | 1.20 | 1.18 |
| Middle Coke Bed | 1.25 | 1.13 | 1.55 |
| Bottom Coke Bed | 1.48 | 1.11 | 1.17 |
| % of coke bed having CTE of <1.2 × 10$^{-6}$/° C. | 0% | 100% | 60% |

*Fresh feed is first feed, and recycle feed is second feed.

It can be observed from Table 5 that with 30% recycle of unhydrotreated recycle stream (second feed in example 2), 100% of the coke bed exhibited CTE of <1.2×10$^{-6}$/° C. under identical operating conditions (see FIG. 4). Whereas on further increase in the recycle of unhydrotreated recycle stream above 30%, the bed quantity exhibiting CTE of <1.2×10$^{-6}$/° C. decreased to 60%.

Comparison of the Needle Coke Produced from the First Feed: CSO-2 Mixed with VGO:

It can be observed from Table 2 that in: (i) Example 4, there was only first feed (CSO-2) without recycle, (ii) Example 5, there was first feed (CSO-2) recycled with 43.1% second feed (heavy coker distillate) on fresh feed basis, (iii) Example 6, there was a mixed first feed (i.e. 84.2% CSO-2 and 15.8% VGO) without recycle, and (iv) Example-7, there was a mixed first feed (i.e. 90% CSO-2 and 10% VGO) recycled with 24.6% second feed (heavy coker distillate) on first feed basis.

Table 6 illustrates the quality of needle coke of the entire coke drum with CSO-2 and VGO.

TABLE 6

Needle coke quality of entire coke drum when CSO-2 and VGO were mixed

|  | Ex. 4 | Ex. 5 | Ex. 6 | Ex. 7 |
|---|---|---|---|---|
| Composite Coke CTE × $10^{-6}$/° C. | 1.22 | 1.32 | 1.21 | 1.04 |
| Sulfur, mass % | 0.42 | 0.46 | 0.37 | 0.41 |

In comparison to the processing of only CSO-2 without recycle (example-4), 43% unhydrotreated recycle (Example-5) has given needle coke with higher CTE as well higher sulfur.

In case of a mixture of CSO-2 and VGO (Example-6), although the sulphur content has reduced significantly in comparison to Example-4, very small improvement in overall CTE of entire coke bed was observed. Whereas, with 24% unhydrotreated recycle (Example-7) along with CSO-2 and VGO as first feed, a significant improvement in CTE was observed and the sulfur was also slightly lower than example-4. Therefore, optimum amount of unhydrotreated recycle stream (second feed) was required to get good quality needle in higher yield.

Table 7 illustrates zone-wise needle coke quality at different throughput ratios of CSO-2 and VGO.

TABLE 7

Zone-wise needle coke quality at different throughput ratios of CSO-2 and VGO

|  | Ex. 4 | Ex. 5 | Ex. 6 | Ex. 7 |
|---|---|---|---|---|
| Feed | CSO-2 | CSO-2 | CSO-2 (84.2 mass %) + VGO (15.8 mass %) | CSO-2 (90 mass %) + VGO (10 mass %) |
| Throughput Ratio (Fresh feed + Recycle)/Fresh Feed | 1 | 1.43 | 1 | 1.24 |
| Top Coke Bed | 1.20 | 1.25 | 1.18 | 1.05 |
| Middle Coke Bed | 1.22 | 1.37 | 1.09 | 0.88 |
| Bottom Coke Bed | 1.24 | 1.34 | 1.37 | 1.15 |
| % of coke bed having CTE of <1.2 × $10^{-6}$/° C. | 30% | 0% | 60% | 100% |

*Fresh feed is first feed, and recycle feed is second feed.

It was observed from Table 7 that with recycle of unhydrotreated recycle stream (second feed) in CSO-2 (first feed), there was no coke exhibiting CTE of <$1.2 \times 10^{-6}$/° C. was produced. There was decrement in the quality of the coke so produced after recycle to CSO-2.

When CSO-2 was mixed with VGO in a ratio of 5.3:1 (example-6) without recycle, there was improvement in the quantity of the good quality needle coke produced as compared to the fresh CSO-2 without recycle (example-4). Further, when CSO-2 was mixed with VGO in a ratio of 9:1, and blended with 25% of heavy coker distillate (second feed) (example-7), 100% of the coke bed exhibits CTE of <$1.2 \times 10^{-6}$/° C. under identical operating conditions.

The needle coke so obtained was further calcined to produce calcined needle coke which can be used as raw material for graphite electrodes.

Technical Advancements

The present disclosure described herein above has several technical advantages including, but not limited to, the realization of a process for the production of needle coke that:
 eliminates the step of hydrotreating of the fresh feed and recycle stream for the production of good quality coke;
 maximizes the production of the needle coke having low CTE and low sulfur content in the delayed coker coke drum;
 provides specific recycle amount of the unhydrotreated heavy coker distillate fraction, which affects the quality and quantity of the needle coke;
 maximizes the amount of good quality needle coke without use of expensive hydrogenation of main feed and recyclable heavy hydrocarbon fraction generated during coker operation or without use of inorganic additives in coker feed; and
 is simple, efficient and cost effective.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for the production of needle coke, said process comprising the following steps:
   (i) mixing a predetermined amount of a first feed and a second feed in a fractionator and simultaneously heating said fractionator to obtain a blend having a first predetermined temperature;
   (ii) passing said blend to a delayed coker furnace and heating said furnace to a second predetermined temperature to obtain a heated coker feed;
   (iii) passing said heated coker feed to a coke drum at a third predetermined temperature and at a predetermined pressure, and maintaining it at said third predetermined temperature and said predetermined pressure for a first predetermined time period to obtain coke and a distillate;
   (iv) separating said coke by allowing said distillate to exit from a top of said coke drum to said fractionator to obtain a separated coke in said coke drum;
   (v) treating said separated coke in said coke drum with superheated steam for a second predetermined time period to obtain a treated coke; and
   (vi) quenching said treated coke with water to obtain said needle coke,
      wherein said first feed is at least one selected from the group consisting of first clarified slurry oil (CSO-1), second clarified slurry oil (CSO-2), and vacuum gas oil (VGO), and
      wherein said second feed has a boiling temperature in the range of 300° C. to 600° C.

2. The process as claimed in claim 1, wherein a mass ratio of said second clarified slurry oil (CSO-2) to said vacuum gas oil (VGO) is in the range of 4:1 to 10:1.

3. The process as claimed in claim 1, wherein a mass ratio of said second clarified slurry oil (CSO-2) to said vacuum gas oil (VGO) is in the range of 5.3:1.

4. The process as claimed in claim 1, wherein a mass ratio of second clarified slurry oil (CSO-2) to said vacuum gas oil (VGO) is 9:1.

5. The process as claimed in claim 1, wherein said first clarified slurry oil (CSO-1) is characterized by having:
   a sulfur content in the range of 0.8 mass % to 1.5 mass % with respect to the total mass of the blend;
   a Conradson Carbon Residue (CCR) in the range of 3 mass % to 8 mass % with respect to the total mass of the blend;
   an ash content in the range of 0.01 mass % to 0.15 mass % with respect to the total mass of the blend;
   a density in the range of 0.5 g/cc to 1.5 g/cc;
   an asphaltene content <5 mass % with respect to the total mass of the blend; and
   a boiling temperature in the range of 197° C. to 700° C.

6. The process as claimed in claim 1, wherein said second clarified slurry oil (CSO-2) is characterized by having:
   a sulfur content in the range of 0.2 mass % to 0.8 mass % with respect to the total mass of the blend;
   a Conradson Carbon Residue (CCR) in the range of 8 mass % to 15 mass % with respect to the total mass of the blend;
   an ash content in the range of 0.01% to 0.1 mass % with respect to the total mass of the blend;
   a density in the range of 0.5 g/cc to 1.5 g/cc;
   an asphaltene content <5 mass % with respect to the total mass of the blend; and
   a boiling temperature in the range of 250° C. to 683° C.

7. The process as claimed in claim 1, wherein said vacuum gas oil (VGO) is characterized by having:
   a sulfur content in the range of 0.08 mass % to 0.15 mass % with respect to the total mass of the blend;
   a Conradson Carbon Residue (CCR) in the range of 0.05 mass % to 0.5 mass % with respect to the total mass of the blend;
   an ash content in the range of 0 to 0.15 mass % with respect to the total mass of the blend;
   a density in the range of 0.5 g/cc to 1.5 g/cc;
   an asphaltene content <5 mass % with respect to the total mass of the blend; and
   a boiling temperature in the range of 284° C. to 594° C.

8. The process as claimed in claim 1, wherein said first feed is unhydrotreated.

9. The process as claimed in claim 1, wherein said first feed and said second feed are not hydrogenated.

10. The process as claimed in claim 1, wherein said second feed is a heavy recycle stream selected from heavy coker oil gas (HCGO), heavy coker distillate, and heavy hydrocarbon stream.

11. The process as claimed in claim 1, wherein said predetermined amount of said second feed is in the range of 25 mass % to 40 mass % with respect to the total mass of the first feed.

12. The process as claimed in claim 1, wherein said first feed and said second feed are pre-heated to a temperature in the range of 150° C. to 250° C. prior to mixing in said fractionator in step (i).

13. The process as claimed in claim 1, wherein said first predetermined temperature is in the range of 300° C. to 400° C.

14. The process as claimed in claim 1, wherein said second predetermined temperature is in the range of 400° C. to 600° C.

15. The process as claimed in claim 1, wherein said second predetermined temperature is in the range of 480° C. to 515° C.

16. The process as claimed in claim 1, wherein said third predetermined temperature is in the range of 400° C. to 600° C., said predetermined pressure is in the range of 2 kg/cm$^2$(g) to 10 kg/cm$^2$(g), and said first predetermined time period is in the range of 15 hours to 50 hours.

17. The process as claimed in claim 1, wherein said superheated steam has a temperature in the range of 300° C. to 500° C., and a pressure in the range of 2.5 kg/cm$^2$(g) to 10 kg/cm$^2$(g); and said second predetermined time period is in the range of 1 hour to 30 hours.

18. The process as claimed in claim 1, wherein said needle coke has a co-efficient of thermal expansion (CTE) of less than 1.2×10-6/° C.

19. The process as claimed in claim 1, wherein said predetermined amount of said second feed is 30 mass % with respect to the total mass of the first feed.

20. The process as claimed in claim 1, wherein said predetermined amount of said second feed is 25 mass % with respect to the total mass of the first feed.

* * * * *